United States Patent
Cheng

(10) Patent No.: US 6,222,121 B1
(45) Date of Patent: Apr. 24, 2001

(54) DATA STORAGE APPARATUS WITH A BUFFER FRAME

(75) Inventor: Ted Cheng, Hsinchu Hsien (TW)

(73) Assignee: Getac Corporation (TW)

( * ) Notice: Subject to any disclaimer, the term of this patent is extended or adjusted under 35 U.S.C. 154(b) by 0 days.

(21) Appl. No.: 09/401,912

(22) Filed: Sep. 23, 1999

(51) Int. Cl.[7] .................... H02G 3/08; H05K 5/00

(52) U.S. Cl. ........................... 174/52.1; 206/521

(58) Field of Search ............... 174/52.1; 361/684, 361/685; 206/521

(56) References Cited

U.S. PATENT DOCUMENTS 5,491,608 * 2/1996 Koyanagi et al. ............... 361/685

* cited by examiner

Primary Examiner—Dean A. Reichard
Assistant Examiner—Hung V. Ngo
(74) Attorney, Agent, or Firm—Howrey Simon Arnold & White, LLP; Ira D. Finkelstein

(57) ABSTRACT

A data storage apparatus includes a data storage device and a buffer frame. The data storage device has a housing with an outer surface. The buffer frame includes a casing and an elastomeric cushioning unit. The casing has a surrounding wall that surrounds the housing of the data storage device. The surrounding wall has an inner surface that forms a clearance with the outer surface of the housing. The cushioning unit is attached on the outer surface of the housing of the data storage device. The cushioning unit is disposed in the clearance, and is in tight contact with the inner surface of the surrounding wall of the casing for positioning the data storage device in the casing.

1 Claim, 4 Drawing Sheets

DATA STORAGE APPARATUS WITH A BUFFER FRAME

BACKGROUND OF THE INVENTION

1. Field of the Invention

This invention relates to a data storage apparatus with a buffer frame which absorbs undesired external shock in order to protect a data storage device in the apparatus from damage due to the shock.

2. Description of the Related Art

An electronic data storage device, such as a hard disk drive unit or a compact disk drive unit, generally includes fine parts that are sensitive to shock. The data storage device installed in a computer might be damaged and might be unable to work properly due to the shock that occurs during transport thereof or during accidental impact. Additional cost is incurred when replacing or repairing the data storage device. It is thus desirable to provide a buffer frame for the data storage device in order to guard the same against external shock.

SUMMARY OF THE INVENTION

Therefore, the object of the present invention is to provide a data storage apparatus which includes a data storage device and a buffer frame for cushioning the data storage device in order to protect the device against external shock.

Accordingly, the data storage apparatus of the present invention includes a data storage device and a buffer frame. The data storage device has a housing with an outer surface. The buffer frame includes a casing and an elastomeric cushioning unit. The casing has a surrounding wall that surrounds the housing of the data storage device. The surrounding wall has an inner surface that forms a clearance with the outer surface of the housing. The cushioning unit is attached on the outer surface of the housing of the data storage device. The cushioning unit is disposed in the clearance, and is in tight contact with the inner surface of the surrounding wall of the casing for positioning the data storage device in the casing.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
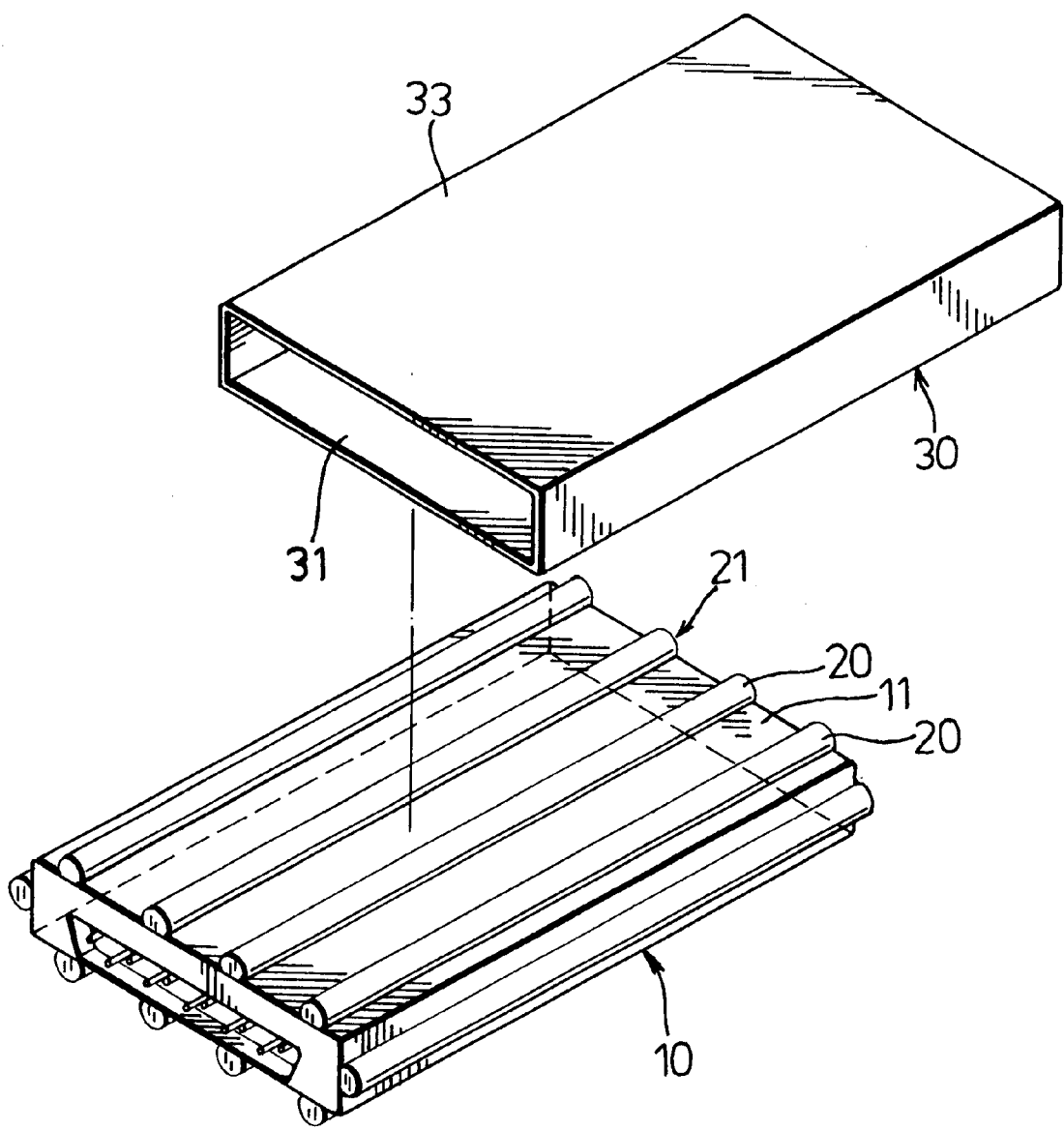
FIG. 1 is a partly exploded perspective view of the data storage apparatus of a first preferred embodiment according to the present invention.
Figure 2:
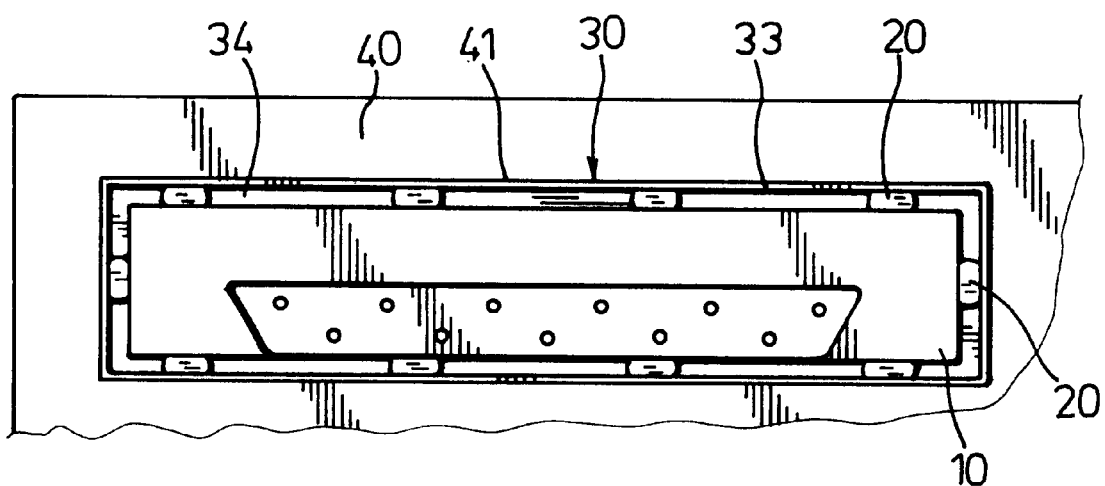
FIG. 2 is an elevational schematic view illustrating the data storage apparatus of the first preferred embodiment when installed in an inner frame of a computer unit.

Referring to FIGS. 1 and 2, the data storage apparatus of the first preferred embodiment of the present invention is shown to include a data storage device 10 and a buffer frame having a casing 30 and a cushioning unit 21.

The data storage device 10 is in the form of a hard disk drive unit or a compact disk drive unit, and includes a rectangular housing with an outer surface 11.

The cushioning unit 21 includes a plurality of elastomeric strips 20, each of which is made of a thermoplastic elastomer and is cylindrical in shape in the present embodiment. The elastomeric strips 20 are arranged around the outer surface 11 of the housing of the data storage device 10 and are secured thereto, such as with the use of adhesives. Each of the elastomeric strips 20 is disposed on the data storage device 10 so as to extend from a front end of the housing to a rear end of the housing.

The casing 30 has a rectangular surrounding wall 33 which confines a space with an opening 31 in the front and rear ends of the surrounding wall 33 to permit insertion of the data storage device 10 into the space via the opening 31 after the elastomeric strips 20 are adhered to the outer surface 11 of the housing of the data storage device 10. The surrounding wall 33 surrounds the housing of the data storage device 10, and has an inner surface that forms a clearance 34 with the outer surface 11 of the housing of the data storage device 10. The elastomeric strips 20 are disposed in the clearance 34, and are in tight contact with the inner surface of the surrounding wall 33 of the casing 30 so as to position the data storage device 10 in the casing 30.

In use, the data storage apparatus that includes the data storage device 10, the casing 30, and the elastomeric strips 20 disposed between the casing 30 and the data storage device 10 is installed in a recess 41 formed in an inner frame 40 of a computer unit.

When an external shock is transmitted to the casing 30 via the inner frame 40 of the computer unit, the elastomeric strips 20 can absorb the shock to protect the data storage device 10 from damage.

Figure 3:
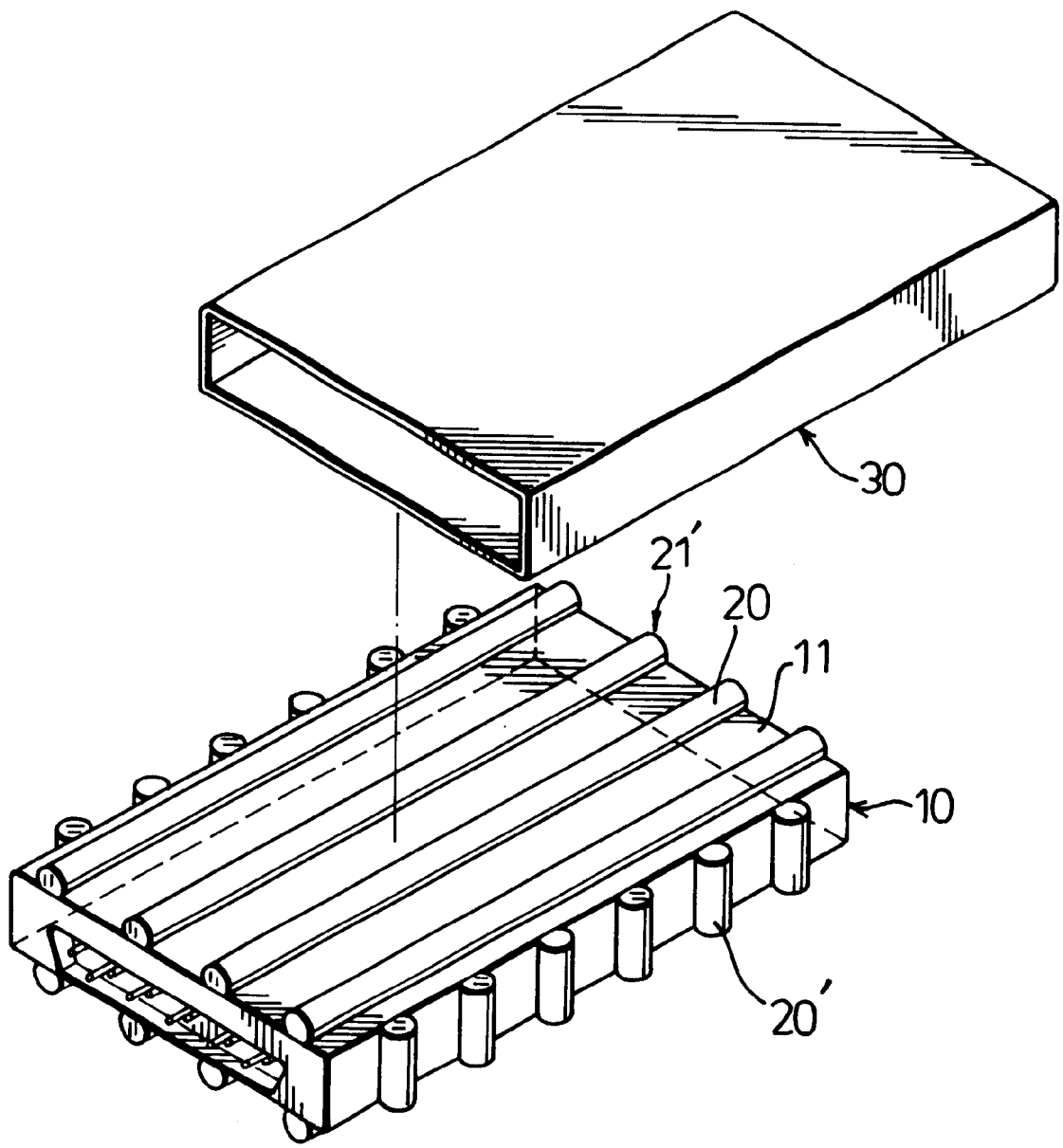
FIG. 3 is a partly exploded perspective view of the data storage apparatus of a second preferred embodiment according to the present invention.
Figure 4:
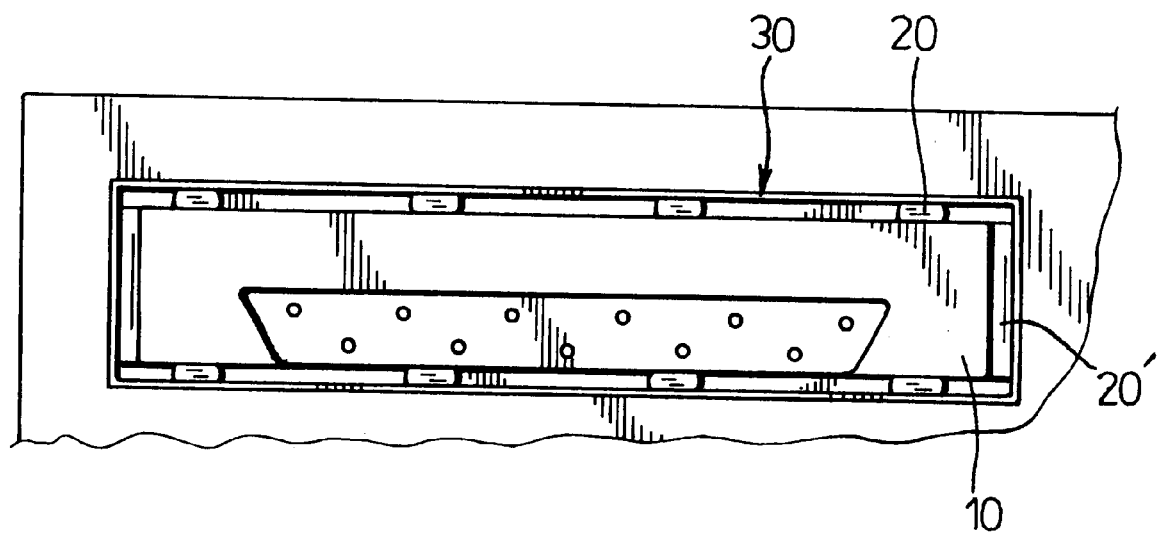
FIG. 4 is a schematic view illustrating the data storage apparatus of the second preferred embodiment when installed in an inner frame of a computer unit.

Referring to FIGS. 3 and 4, the data storage apparatus of the second preferred embodiment according to the present invention is shown to also include a data storage device 10, and a buffer frame having a casing 30 and a cushioning unit 21'. The cushioning unit 21' differs from the cushioning unit 21 in the previous embodiment in that the cushioning unit 21' includes a plurality of first elastomeric strips 20 and a plurality of second elastomeric strips 20'.

The first elastomeric strips 20 are attached on top and bottom sides of the outer surface 11 of the housing of the data storage device 10, and are disposed to extend horizontally from the front end of the housing to the rear end of the housing. The second elastomeric strips 20' are attached to opposite lateral sides of the outer surface 11 of the housing of the data storage device 10, and are disposed to extend vertically from a top end of the housing to a bottom end of the housing. The first and second elastomeric strips 20, 20' cooperatively provide a relatively good cushioning effect to protect the data storage device 10 from damage due to external shock.

With this invention thus explained, it is apparent that numerous modifications and variations can be made without departing from the scope and spirit of this invention. It is therefore intended that this invention be limited only as indicated in the appended claims.

I claim:

1. A data storage apparatus comprising:

a data storage device which has a housing with an outer surface, front and rear ends, and top and bottom ends, said outer surface having top and bottom sides and two lateral sides interconnecting said top and bottom sides;

a casing having a surrounding wall that surrounds said housing of said data storage device, said surrounding wall having an inner surface that forms a clearance with said outer surface of said housing; and an elastomeric cushioning unit attached on said outer surface of said housing of said data storage device, said cushioning unit being disposed in said clearance and being in tight contact with said inner surface of said surrounding wall of said casing for positioning said storage device in said casing, wherein said cushioning unit includes a plurality of first elastomeric strips attached on said top and bottom sides of said outer surface of said housing and a plurality of second elastomeric strips attached on said lateral sides of said outer surface of said housing, said first elastomeric strips being disposed so as to extend from said front end to said rear end of said housing, and said second elastomeric strips being disposed so as to extend from said top end to said bottom end of said housing.

* * * * *